Jan. 31, 1961     M. B. PREEMAN     2,969,851
GAS WASHING APPARATUS
Filed April 13, 1959
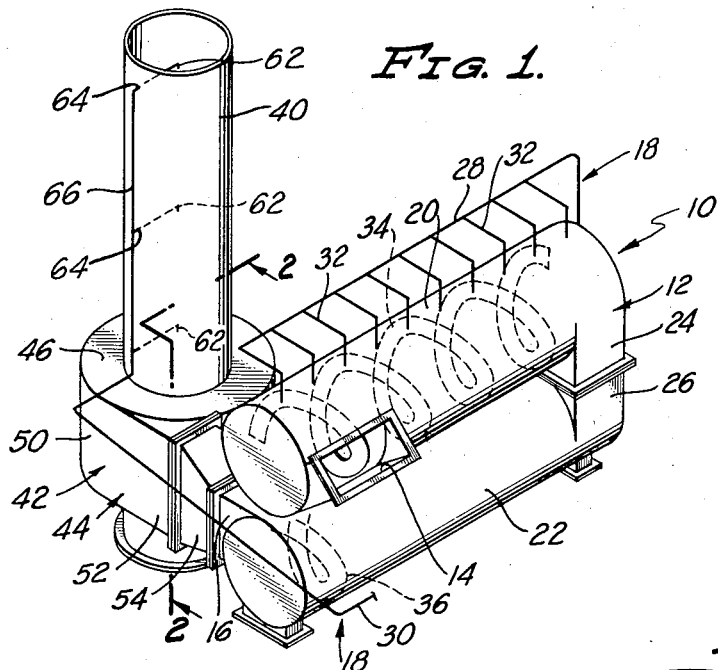
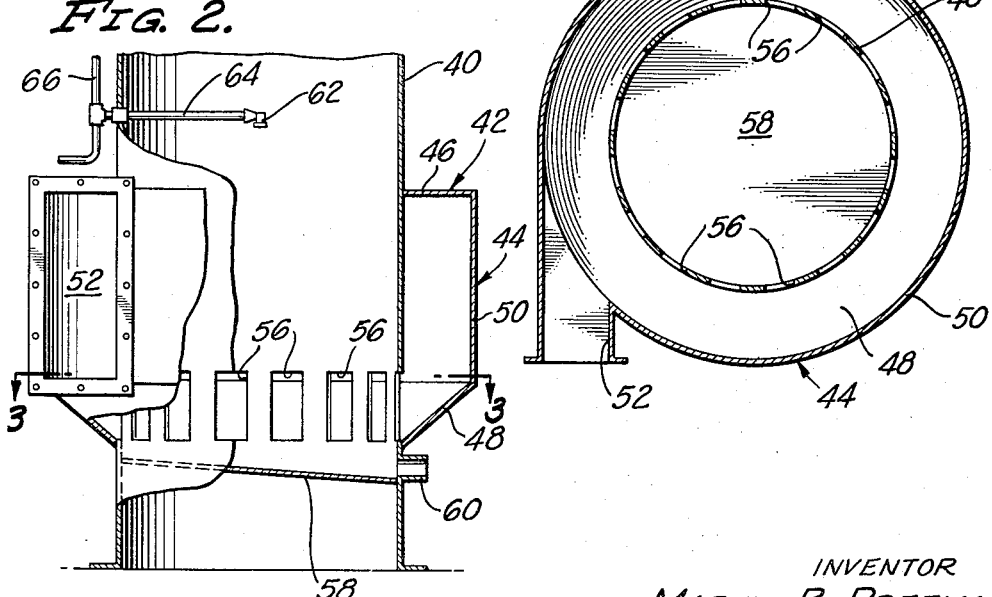
INVENTOR
MARVIN B. PREEMAN
BY HIS ATTORNEYS
HARRIS, KIECH, RUSSELL & KERN

# United States Patent Office 2,969,851
Patented Jan. 31, 1961

2,969,851

GAS WASHING APPARATUS

Marvin B. Preeman, Los Angeles, Calif., assignor to Standard Steel Corporation, Los Angeles, Calif., a corporation of California Filed Apr. 13, 1959, Ser. No. 806,072

4 Claims. (Cl. 183—21)

The present invention relates in general to a gas scrubbing or washing apparatus and, more particularly, to an apparatus which utilizes a liquid such as water to remove dust, or other entrained particles, from a stream of gas such as air.

Apparatus of the foregoing nature is widely used to remove dust, or similar contaminants, from air before it is discharged into the atmosphere so as to minimize air pollut.on. For example, apparatus of this character is employed to wash the air used for drying aggregates in the making of asphalt mixes, although the invention is not restricted thereto.

In general, the invention contemplates a gas washing apparatus comprising spray chamber means into which liquid is sprayed to wash gas flowing therethrough, and comprising an upright stack through which the gas discharged from the spray chamber means flows upwardly into the atmosphere. The stack is preferably a scrubber having means for spraying a liquid into the stream of gas moving upwardly therethrough.

While gas washing equipment of the foregoing nature performs its function quite effectively, an important object of the invention is to improve the efficiency of such equipment by inserting a centrifugal separator between the spray chamber means and the stack, such separator having a tangential inlet which communicates with the outlet cf the spray chamber means and having a central or internal outlet which communicates with the interior of the stack. With this construction, the air or other gas entering the separator from the spray chamber means is subjected to a centrifugal separating action before it enters the stack to minimize the amount of dust, or other contaminants, entrained in the air discharged from the stack.

More particularly, an important object of the invention is to provide a centrifugal separator which encompasses and has an outlet communicating with the stack adjacent the lower end thereof, and which has a tangential inlet communicating with the outlet of the spray chamber means.

Still more particularly, an object of the invention is to provide a centrifugal separator encompassing the stack adjacent the lower end thereof and comprising an annular housing encircling and carried by the stack and having top, bottom and peripheral walls, the annular housing having tangential inlet in its peripheral wall and the stack having a plurality of circumferentially spaced outlet openings therethrough which are located adjacent the bottom wall of the annular housing and which connect the interior of the annular housing and the interior of the stack in fluid communication. With this construction, gas entering the annular housing through the tangential inlet flows therefrom into the stack through the openings mentioned after whirling around the stack within the annular housing to effect centrifugal separation of entrained contaminants escaping from the spray chamber means.

Another object is to provide a construction wherein the bottom wall of the annular housing of the centrifugal separator slopes inwardly and downwardly to the stack at the bot:oms of the openings therein, whereby water or other liquid separated from the air or other gas by centrifugal action within the annular housing drains downwardly along the bottom wall of the annular housing and through the openings in the stack into the interior of the stack.

Still another object is to provide a sloping wall traversing the stack below the openings therein and to provide the stack with a drain above the lowermost portion of the sloping wall. With this construction, any water or other liquid entering the stack through the openings from the annular housing of the centrifugal separator, or sprayed into the stack, runs down the sloping wall mentioned and is discharged through the drain in the stack.

The foregoing objects, advantages, features and results of the present invention, together with various other objects, advantages, features and results thereof which will be evident to those skilled in the gas washing art in the light of this disclosure, may be attained with the exemplary embodiment of the invention described in detail hereinafter and illustrated in the accompanying drawing, in which:

Fig. 1 is a semidiagrammatic isometric view of a gas washing apparatus which embodies the invention;

Fig. 2 is an enlarged, fragmentary sectional view taken along the arrowed line 2—2 of Fig. 1, and Fig. 3 is a sectional view taken along the arrowed line 3—3 of Fig. 2.

The numeral 10 designates a gas washing means including spray chamber means 12 having an inlet 14 and an outlet 16, and including means designated generally by the numeral 18 for spraying a liquid into the spray chamber means to wash gas flowing therethrough from the inlet to the outlet. In the particular construction illustrated, the spray chamber means 12 is U-shaped and includes superimposed spray chambers 20 and 22 respectively forming the arms of the U and respectively having the inlet 14 and the outlet 16 formed therein adjacent the free ends thereof. The spray chamber 20 is provided opposite the inlet 14 with an outlet 24 connected to an inlet 26 of the spray chamber 22 to provide a continuous path for the gas being washed from the inlet 14 to the outlet 16.

The spraying means 18 includes manifolds 28 and 30, the manifold 28 having branches 22 terminating in spray nozzles, not shown, within and spaced along the spray chamber 20. The manifold 30 is provided with similar branches terminating in spray nozzles within and spaced along the spray chamber 22, the branches of the manifold 30 having been omitted from the drawing for clarity. In order to enhance cleaning of the gas flowing through the spray chambers 20 and 22, these are provided with helical baffles 34 and 36, respectively, which cause the stream of gas to tend to follow helical paths through the spray chambers 20 and 22. The helical baffles 34 and 36 thus cause the stream of gas to tend to whirl its way through the spray chambers 20 and 22 to supplement the washing action with a centrifugal separating action which increases the effectiveness of the spray chamber means 12 in removing dust, or other contaminants, from the gas.

Adjacent the washing means 10 is an upright stack 40 which is shown as communicating with the atmosphere at its upper end. Encircling the stack 40 adjacent its lower end is a centrifugal separator 42 which connects the outlet 16 of the spray chamber means 12 to the interior of the stack 40.

The centrifugal separator 42 includes an annular housing 44 encircling and carried by the stack adjacent the lower end thereof and having top, bottom and peripheral walls 46, 48 and 50, respectively. Formed in the peripheral wall 50 of the annular housing 44 is a tangential inlet 52 which is connected to the outlet 16 of the spray chamber means 12 by a duct 54. The stack 40 is provided therein just above the bottom wall 48 of the annular housing 44 with a plurality of circumferentially spaced openings 56 serving as a central outlet for the separator 42 and connecting the interior of the housing 44 and the interior of the stack 40 in fluid communication. The bottom wall 48 of the annular houing 44 slopes inwardly and downwardly to the stack 40 and terminates at the bottoms of the openings 56 so that water, or other liquid, removed from the gas within the annular housing 44 runs downwardly along the bottom wall 48 and through the openings 56 into the stack 40. A sloping wall 58 traverses the stack 40 below the openings 56 and the stack is provided with a drain 60 just above the lowermost portion of the sloping wall. Thus, any water, or other liquid, entering the stack 40 runs downwardly along the sloping wall 58 and out the drain 60.

The centrifugal separator 42 causes the gas entering the annular housing 44 thereof through the tangential inlet 52 to whirl around the stack within the annular housing before entering the stack through the openings 56. Thus, most of the dust particles, or other contaminants, which are not removed by the washing means 10 are deposited on the peripheral wall 50 of the annular housing 44 by the centrifugal action of the separator 42, along with entrained droplets of water, or other liquid, to increase the over-all cleaning efficiency of the aparatus disclosed, which is an important feature of the invention.

To further improve the cleaning efficiency of the apparatus, the gas flowing upwardly through the stack 40 is preferably scrubbed by spraying liquid thereinto at vertically spaced points. This is accomplished by disposing within the stack 40 vertically spaced spray nozzles 62 respectively connected to branches 64 of a manifold 66, this manifold being connected to a suitable source of washing liquid, such as water, as are the manifolds 28 and 30 mentioned previously.

The over-all effect of the gas washing apparatus of the invention is to discharge into the atmosphere air which is substantially completely free of dust, or the like, thereby minimizing air pollution. The centrifugal separator 42 interconnecting the washing means 10 and the stack 40 contributes materially to the over-all effectiveness of the apparatus and represents an important feature of the invention.

Although an exemplary embodiment of the invention has been disclosed herein for purposes of illustration, it will be understood that various changes, modifications and substitutions may be incorporated therein without departing from the spirit of the invention as defined by the claims which follow:

I claim:

1. In a gas washing apparatus, the combination of: gas washing means including spray chamber means having an inlet and an outlet and including means for sprayig a liquid into said spray chamber means to wash gas flowing therethrough from said inlet to said outlet; an upright stack; a centrifugal separator encompassing said stack adjacent the lower end thereof, said separator including an annular housing encircling and carried by said stack and having top, bottom and peripheral walls, said annular housing having in said peripheral wall thereof a tangential inlet which communicates with said outlet of said spray chamber means, said stack having a plurality of circumferentially spaced openings therethrough which connect the interior of said annular housing and the interior of said stack in fluid communication, whereby gas entering said annular housing through said tangential inlet flows therefrom into said stack through said openings after whirling around said stack within said annular housing; means for spraying a liquid into said stack above said separator to further wash gas flowing upwardly through said stack; and means for draining liquid from said anular housing and said stack.

2. In a gas washing apparatus, the combination of: gas washing means including spray chamber means having an inlet and an outlet and inclding means for sprayig a liquid into said spray chamber means to wash gas flowing therethrough from said inlet to said outlet; an upright stack; and a centrifugal separator encompassing said stack adjacent the lower end thereof, said separator including an annular housing encircling and carried by said stack and having top, bottom and peripheral walls, said annular housing having in said peripheral wall thereof a tangential inlet which communicates with said outlet of said spray chamber means, said stack having a plurality of circumferentially spaced openings therethrough which are located adjacent said bottom wall of said annular housing and which connect the interior of said annular housing and the interior of said stack in fluid communication, whereby gas entering said annular housing through said tangential inlet flows therefrom into said stack through said openings after whirling around said stack within said annular housing, said bottom wall of said annular housing sloping inwardly and downwardly to said stack so that liquid removed from the gas within said annular housing drains downwardly along said bottom wall of said annular housing and through said openings into said stack.

3. In a gas washing apparatus, the combination of: gas washing means including spray chamber means having an inlet and an outlet and inc'uding means for spraying a liquid into said spray chamber means to wash gas flowing therethrough from said inlet to said outlet; an upright stack; a centrifugal separator encompassing said stack adjacent the lower end thereof, said separator including an annular housing encircling and carried by said stack and having top, bottom and peripheral walls thereof, a tangential inlet which communicates with said outlet of said spray chamber means, said stack having a plura'ity of circumferentia'ly spaced openings therethrough which are located adjacent said bottom wall of said annular housing and which connect the interior of said annular housing and the interior of said stack in fluid communication, whereby gas entering said annular housing through said tangential inlet flows therefrom into said stack through said openings after whirling around said stack within said annular housing, said bottom wall of said annular housing sloping inwardly and downwardly to said stack so that liquid removed from the gas within said annular housing drains downwardly along said bottom wall of said annular housing and through said openings into said stack; and a sloping wall traversing said stack below said openings therein, said stack having a drain above the lowermost portion of said sloping wall so that any liquid entering said stack through said openings therein flows along said sloping wall to said drain.

4. In a gas washing apparatus, the combination of: gas washing means including spray chamber means having an inlet and an outlet and including means for spraying a liquid into said spray chamber means to wash gas flowing therethrough from said inlet to said outlet; an upright stack; a centrifugal separator encompassing said stack adjacent the lower end thereof, said separator including an annular housing encircling and carried by said stack and having top, bottom and peripheral walls, said annular housing having in said peripheral wall thereof a tangential inlet which communicates with said outlet of said spray chamber means, said stack having a plurality of circumferentially spaced openings therethrough which are located adjacent said bottom wall of said annular housing and which connect the interior of said annular housing and the interior of said stack in fluid communication, whereby gas entering said annular housing through said tangential inlet flows therefrom into said stack through said openings after whirling around said stack within said annular housing; and means for spraying a liquid into said stack above said separator to further wash gas flowing upwardly through said stack.

References Cited in the file of this patent

UNITED STATES PATENTS

| | | |
|---|---|---|
| 948,062 | Morgan | Feb. 1, 1910 |
| 964,428 | Johnson et al. | July 12, 1910 |
| 2,473,672 | Zibiotto | June 21, 1949 |
| 2,560,069 | Bloomer | July 10, 1951 |

FOREIGN PATENTS

| | | |
|---|---|---|
| 515,685 | Belgium | Dec. 15, 1952 |
| 1,091,777 | France | Nov. 18, 1954 |
| 1,171,853 | France | Oct. 6, 1958 |